US012801422B2

(12) United States Patent
White

(10) Patent No.: US 12,801,422 B2
(45) Date of Patent: Nov. 17, 2026

(54) SIDECAR SYSTEM AND METHOD FOR RESPONDING TO COMPUTING SYSTEM OUTAGE

(71) Applicant: Truist Bank, Charlotte, NC (US)

(72) Inventor: Brian Matthew White, Mint Hill, NC (US)

(73) Assignee: TRUIST BANK, Charlotte, NC (US)

( * ) Notice: Subject to any disclaimer, the term of this patent is extended or adjusted under 35 U.S.C. 154(b) by 362 days.

(21) Appl. No.: 18/742,536

(22) Filed: Jun. 13, 2024

(65) Prior Publication Data

US 2025/0383901 A1 Dec. 18, 2025

(51) Int. Cl.
*G06F 9/455* (2018.01)

(52) U.S. Cl.
CPC .................... *G06F 9/45558* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 11,561,868 | B1 * | 1/2023 | Poornachandran | G06F 11/302 |
| 2019/0391834 | A1 * | 12/2019 | Mullen | G06F 9/45558 |
| 2022/0060398 | A1 * | 2/2022 | Shishir | G06F 11/0754 |
| 2023/0121475 | A1 * | 4/2023 | Kowalczyk | G06F 9/485 718/104 |
| 2023/0376360 | A1 * | 11/2023 | Griffin | G06F 9/4856 |
| 2024/0111579 | A1 * | 4/2024 | Chernobrivenko | G06F 9/4881 |

* cited by examiner

*Primary Examiner* — Kaushikkumar M Patel
(74) *Attorney, Agent, or Firm* — Michael A. Springs, Esq.; Shumaker, Loop & Kendrick, LLP; Patrick B. Horne

(57) ABSTRACT

A system and a method for responding to an outage of a computing system use a sidecar computing system and an event manager. The computing system is operatively connected to multiple user devices by a first network. The sidecar computing system includes a processor, a non-transitory storage device and multiple virtual machines, wherein computer-readable instructions are stored in the storage device. A second network operatively connected to the sidecar computing system and the sidecar computing system is deactivated when the computing system is operating. The event manager communicates with the computing system through the first network and the sidecar computing system through the second computer network, wherein the event manager activates the sidecar computing system to operate in an outage mode when the computing system has an outage.

20 Claims, 3 Drawing Sheets

SIDECAR SYSTEM AND METHOD FOR RESPONDING TO COMPUTING SYSTEM OUTAGE

FIELD

The present disclosure relates to a system and a method for responding to service outages in computer systems.

BACKGROUND

Computer system service outages can result in substantial financial losses and damage to customer relations for business enterprises. Vital services such as the Internet, social media, web hosting platforms, banks, entertainment streaming and cloud computing platforms are subject to disruptions. The severity and frequency of such disruptions has spawned reporting services such as Downdetector Enterprise™ monitoring and alerting by Ookla, and Google Cloud Service Health for services that are part of Google Cloud.

Ransomware is a type of malware that creates a service outage by holding sensitive data or a device hostage, threatening to keep it locked—or worse—unless a ransom is paid to the attacker. The earliest ransomware attacks simply demanded a ransom in exchange for the encryption key needed to regain access to the affected data or use of the infected device. By making regular or continuous data backups, an enterprise could limit costs from these types of ransomware attacks and often avoid paying the ransom demand. In recent years, ransomware attacks have evolved to include double-extortion and triple-extortion tactics that raise the stakes considerably. Even victims who rigorously maintain data backups or pay the initial ransom demand are at risk. Double-extortion attacks add the threat of stealing the victim's data and leaking it online. Triple-extortion attacks add the threat of using the stolen data to attack the victim's customers or business partners.

Most enterprises have disaster recovery teams that include employees that have the expertise to analyze the outage and formulate a recovery plan. However, at least in the early stage of the outage, communications among team members is usually only available using unsecured telephone and email channels. This can cause a significant delay is getting the team organized and working on the solution.

BRIEF SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

There is a need to provide a secure communication channel to be used by disaster team members for analyzing a computer system services outage and preparing a resolution plan.

According to at least one embodiment, a system for responding to an outage of a computing system, the computing system being operatively connected to multiple user devices by a first network, includes: a sidecar computing system including a processor, a non-transitory storage device and multiple virtual machines, wherein computer-readable instructions are stored in the storage device; a second network operatively connected to the sidecar computing system; wherein the sidecar computing system is deactivated when the computing system is operating; and an event manager in communication with the computing system through the first network and in communication with the sidecar computing system through the second computer network, wherein the event manager activates the sidecar computing system to operate in an outage mode when the computing system has an outage.

The event manager activates the sidecar computing system in response to an outage event signal generated by at least one of the computing system, the first network and a designated employee through a computing device or a mobile device. The activated sidecar computing system provides access to the virtual machines and a dedicated email system by authorized employees. The event manager deactivates the sidecar computing system, when activated, in response to a resolution of the outage.

The event manager stores updated data from the computing system in the storage device in real time or at predetermined intervals.

The event manager periodically sends a test message to communication devices of authorized employees, the message including a request for a response. When the event manager has not received a response to the test message from one of the employees after a predetermined response period, the event manager sends a reminder message to the one employee and/or generates a request to personally contact the one employee. The test message includes an instruction to test connectively of the communication devices to the sidecar computing system.

The event manager includes a sidecar software application having computer-readable instructions for performing the activation of the sidecar computing system and includes a processor executing the computer-readable instructions, the processor being included in at least one of an event manager computing device, an event manager mobile device and the sidecar computing system.

The computing system and the sidecar computing system have different domain names associated therewith for communication through the Internet.

According to at least another embodiment, a method for responding to an outage of a computing system, the computing system being operatively connected to multiple user devices by a first network, comprises the steps of: providing a sidecar computing system including a processor, a non-transitory storage device and multiple virtual machines, wherein computer-readable instructions are stored in the storage device; operatively connecting the sidecar computing system to a second network; wherein the sidecar computing system is deactivated when the computing system is operating; and providing an event manager in communication with the computing system through the first network and in communication with the sidecar computing system through the second computer network, and operating the event manager to activate the sidecar computing system to operate in an outage mode when the computing system has an outage.

The method includes operating the event manager to activate the sidecar computing system in response to an outage event signal generated by at least one of the computing system, the first network and a designated employee through a computing device or a mobile device. The activated sidecar computing system provides access to the virtual machines and a dedicated email system by authorized employees. The event manager deactivates the sidecar computing system, when activated, in response to a resolution of the outage.

The method includes operating the event manager to store updated data from the computing system in the storage device in real time or at predetermined intervals.

The method includes operating the event manager to periodically send a test message to communication devices of authorized employees, the message including a request for a response. When the event manager has not received a response to the test message from one of the employees after a predetermined response period, operating the event manager to send a reminder message to the one employee and/or generate a request to personally contact the one employee. The test message includes an instruction to test connectively of the communication devices to the sidecar computing system.

The method further comprises the event manager including a sidecar software application having computer-readable instructions for performing the activation of the sidecar computing system and includes a processor executing the computer-readable instructions, the processor being included in at least one of an event manager computing device, an event manager mobile device and the sidecar computing system.

The method includes providing the computing system and the sidecar computing system with different domain names associated therewith for communication through the Internet.

The above summary is to be understood as cumulative and inclusive. The above described embodiments and features are combined in various combinations in whole or in part in one or more other embodiments.

BRIEF DESCRIPTION OF THE SEVERAL VIEWS OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTION OF EMBODIMENTS OF THE INVENTION

Figure 1:
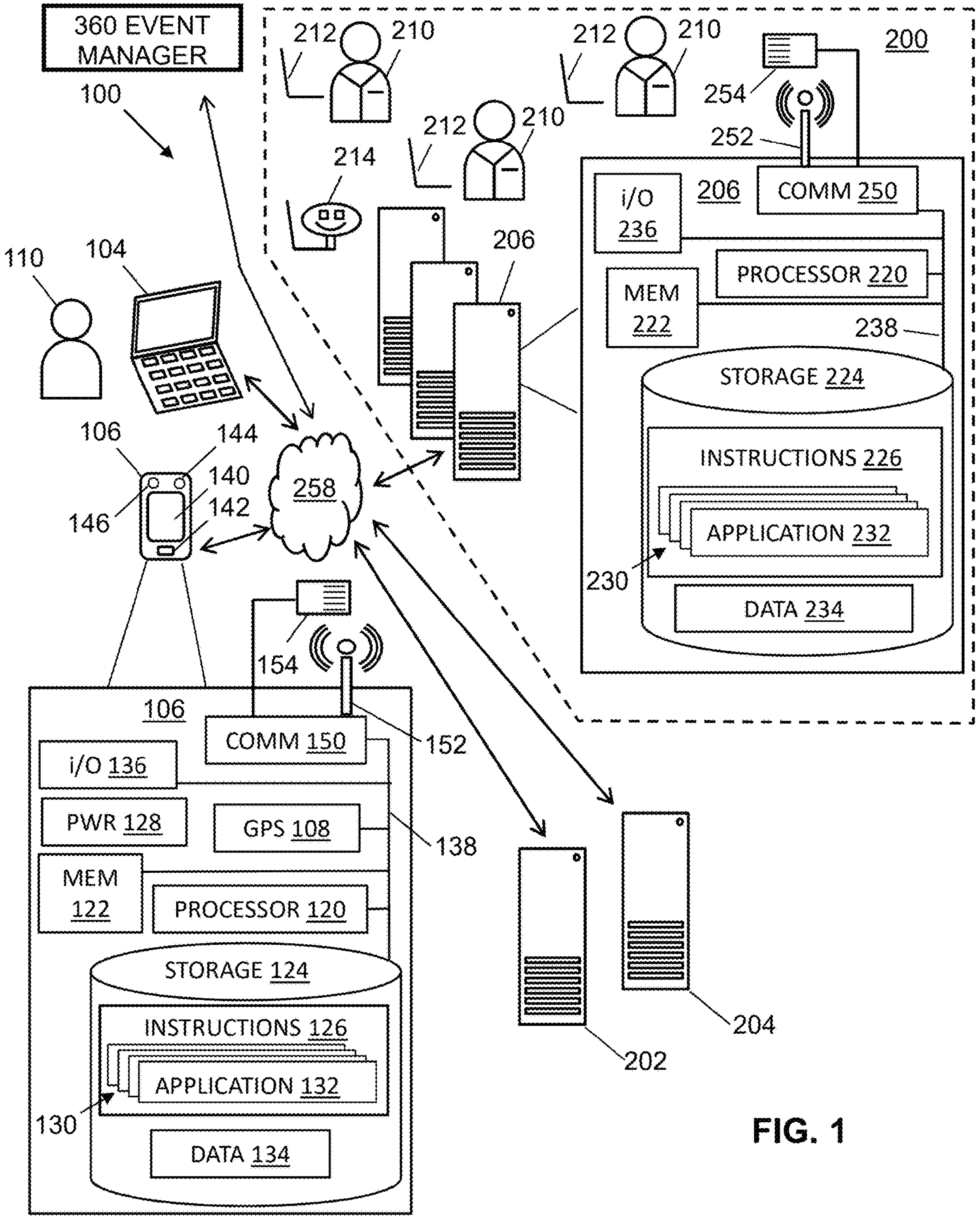
FIG. 1 illustrates an enterprise system and environment thereof, in accordance with various embodiments of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to illustrations and/or block diagrams of systems and apparatuses (the term "apparatus" includes systems and computer program products), will be understood such that each function described or implied with reference to the illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts described, illustrated, and/or implied.

These computer program instructions may also be stored in a computer-readable memory that can direct a computer or other programmable data processing apparatus to function in a particular manner, such that the instructions stored in the computer readable memory produce an article of manufacture including instructions, which implement the function/act described, illustrated, and/or implied.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts described, illustrated, and/or implied. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein. Where functions of hardware and software are described herein, related methods are detailed therewith, such that methods are disclosed as well.

FIG. 1 illustrates a system 100 and environment thereof, according to at least one embodiment, by which a user 110 benefits through use of services and products of an enterprise system 200. The environment may include, for example, a distributed cloud computing environment (private cloud, public cloud, community cloud, and/or hybrid cloud), an on-premise environment, fog computing environment, and/or an edge computing environment. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Further non-limiting examples of input devices and/or output devices include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning system device (GPS) configured to be used by a positioning system to determine a location of the computing device 104 or mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, Internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the Internet and/or any other communication system or systems at one or more locations.

The network 258 may incorporate a cloud platform/data center that supports various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third and fourth party systems such as merchant systems configured to interact with the user device 106 during transactions and also configured to interact with the enterprise system 200 in back-end transactions clearing processes.

In certain embodiments, one or more of the systems and devices, such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Components of a software application can be deployed into a separate process or container to provide isolation and encapsulation. This also enables the application to be composed of heterogeneous components and technologies. This pattern is named "sidecar" because it resembles a sidecar attached to a motorcycle. In the pattern, the sidecar is attached to a parent application and provides supporting features for the application. The sidecar also shares the same lifecycle as the parent application, being created and retired alongside the parent.

The present invention utilizes the sidecar pattern concept to minimize the effect of enterprise system outages due to events such as ransomware attacks and interruptions in the availability of cloud-based subscription software, e.g. Microsoft 365 (formerly Office 365). Thus the systems, devices, and methods described herein improve the functioning of computer systems and networks by reducing downtime in the event of an enterprise system outage.

Figure 2:
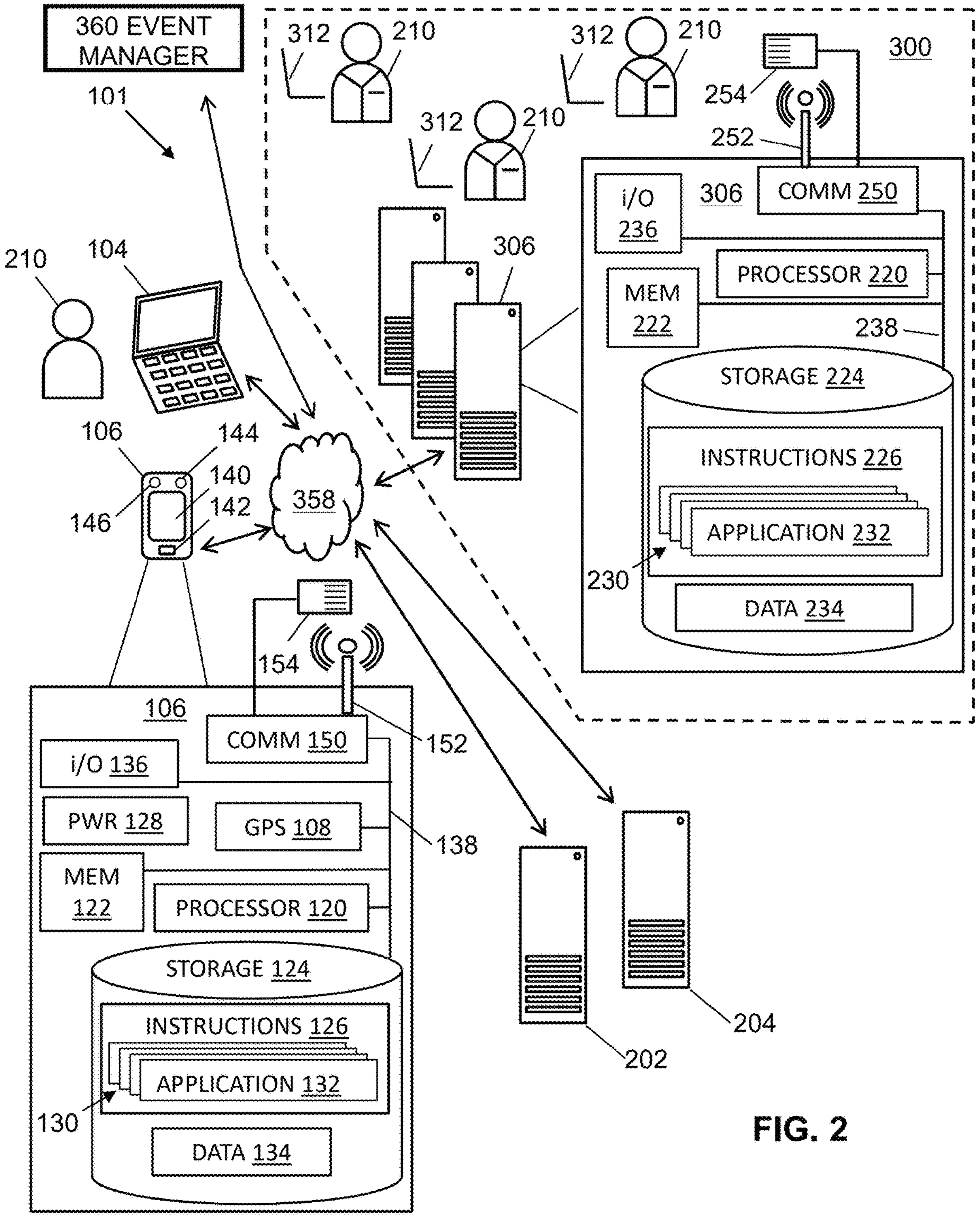
FIG. 2 shows the enterprise system of FIG. 1 with a sidecar system, according to the invention, activated.

FIG. 2 illustrates a system 101 and environment thereof, according to at least one embodiment, wherein a sidecar system 300 is activated in response to an outage of the enterprise system 200 shown in FIG. 1. Like or functionally like elements are provided with identical reference signs in FIGS. 1 and 2. FIG. 2 illustrates a situation in which the enterprise system of 200 has experienced an outage that exceeded a predetermined minimum recovery time. The offline enterprise system 200 and the network 258 have been replaced by the sidecar system 300 and a network 358 incorporating a cloud platform. The cloud platform can provide a sidecar computing system 306 and virtual machines or desktops 312. The storage device 224 stores, as needed, the data, the operating system and applications 230, including the instructions 226 and the applications 232, and the data 234 as duplicates of the corresponding elements of the enterprise system 200 shown in FIG. 1. The sidecar system 300 and the network 358 provide a secure communications channel, including a dedicated email system, for predetermined employees (agents 210 assigned to a disaster recovery team) to collaborate on resolving the outage.

An event manager 360 is in communication with the network 258 of FIG. 1 and the network 358 of FIG. 2. When there is an outage of the computing system 200 for more than the predetermined minimum recovery time a system outage event signal is sent to the event manager 360 through the network 258. The outage event signal can be generated automatically as a service provided by the cloud platform of the network 258 and/or by a designated employee of the enterprise from a computing device 104 or a mobile device 106. If the network 258 is not available, the outage event signal can be sent through the network 358. The event manager 360 responds to the outage event signal by activating the sidecar system 300 to operate in an outage mode. The systems 200 and 300 have different domain names for increased security.

The event manager 360 can be a mobile device or a computing device with a processor running an event manager software application to process the system outage event signal and perform other tasks. The event manager processor and could be included in the sidecar computing system 306 and accessed by a computing device or a mobile device. The data stored in the system 200 is updated on a real-time basis. The updated data must communicated to the sidecar system 300 for storage. The event manager 360 can control the data transfer on a continuous basis or with periodic updates by generating data update events. Another task of the event manager 360 is testing/checking the current status of communications with employees who are assigned to the disaster recovery team. These employees have mobile devices and/or personal computing devices with email accounts tied to the sidecar domain name. The event manager 360 generates a test event to send periodic email messages to the employee mobile devices, which messages request a response. For example, the test event is generated monthly. If the event manage 360 does not receive a response to any message, a follow-up email can be sent and/or personal contact is made with the employee.

Figure 3:
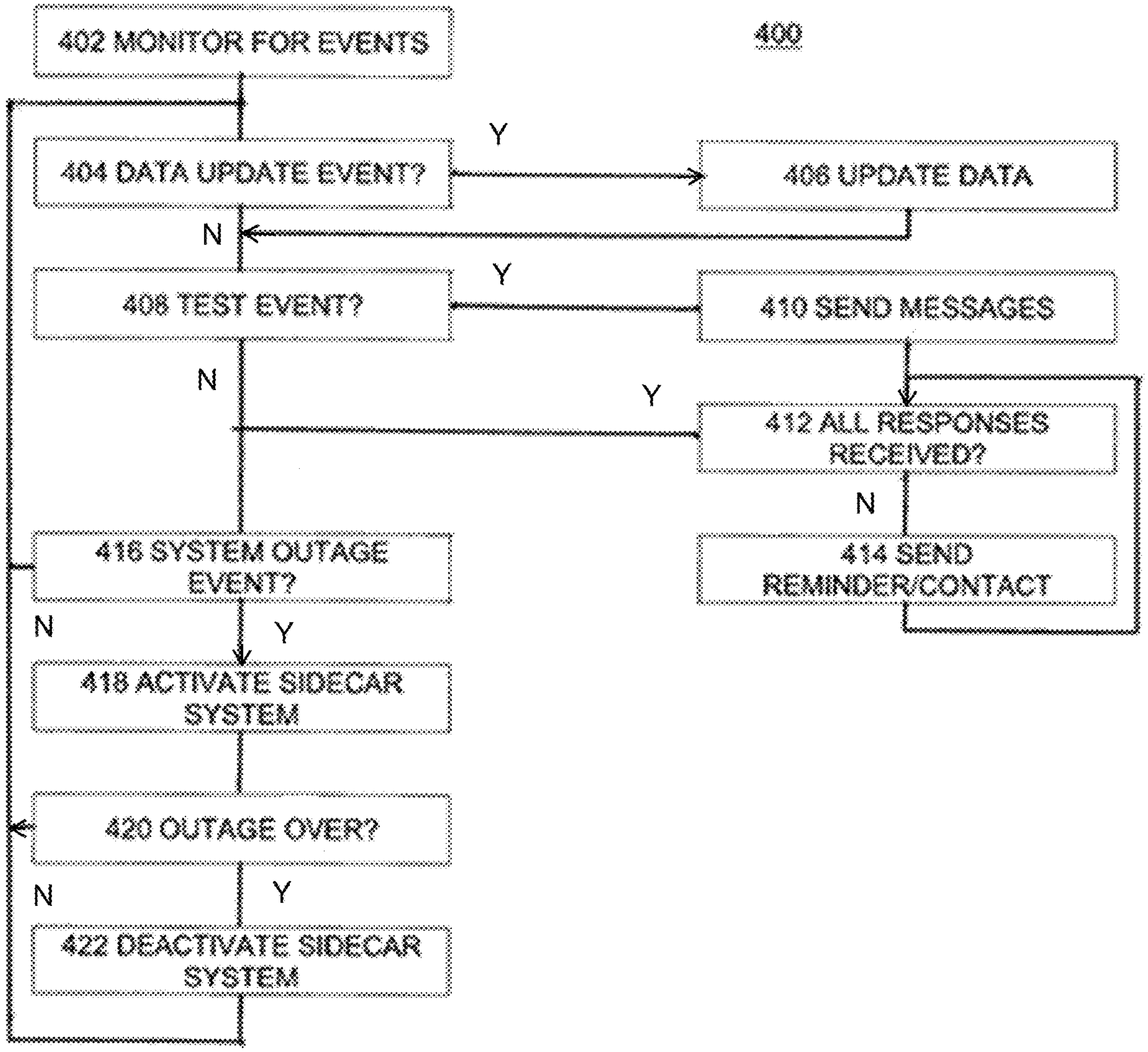
FIG. 3 is a flow diagram of the method of operating the sidecar system according to the invention.

FIG. 3 is a flow diagram of a method 400 of operating the sidecar system 300 according to an embodiment of the invention. The method starts at a step 402 wherein the event manager 360 monitors for the occurrence of various events such as a data update event, a test event and a system outage event. When one of the events occurs, the event manager 360, in a step 404, checks whether the event is a data update event and, if yes "Y", performs a data update step 406 on the data 234 in the sidecar system 300 based upon the current data 234 in the enterprise system 200. The data updating operation would not be required if the computing system 200 has backup storage that was not involved in the outage.

The method 400 enters a step 408 from the step 406 and in response to no "N" from the step 404. The method checks whether the event is a test event in the step 408. If yes "Y", the method performs a step 410 by sending test messages by email or text to the mobile devices of all disaster team employees that are involved when the sidecar system 300 is activated. The test messages include an instruction to test connectivity to the sidecar computing system 306 and a request for a confirming response. In a step 412, the method checks for responses to the messages. If not all responses have been received within a predetermined response period at no "N", the method performs a step 414 of sending reminder messages and/or a request to personally contact the employees by other means. Then the method continues checking for responses at the step 412. When all responses have been received, the method enters a step 416 from yes "Y", which step 416 also is entered from a no "N" at the step 408.

In the step 416, the method 400 checks whether the event is a system outage event. If no "N", the method returns to the step 404 to wait for the next event. If yes "Y", the method 400 performs a step 418 of activating the sidecar system 300 to operate in an outage mode. This might require disconnecting the enterprise system 200 from the network 258 while the reason for the outage is corrected. The outage mode operation begins by notifying the members (agent 210) of the disaster recovery team of the event via their mobile devices 106 and/or personal computing devices 104. The members then communicate using the sidecar email through the network 358 and have access to the virtual machines 312. Next, the method 400 performs a step 420 by checking whether the outage is over. If no "N", the method returns to the step 404 to wait for the next event. If yes "Y", the event manager 360 has received an outage over signal that triggers an outage over event. The method 400 performs a step 422 of deactivating the sidecar system 300 and the enterprise system 200 can resume operation.

Thus, the sidecar system 300 provides a means and a method for members of a computer disaster recovery team to securely and quickly communicate while identifying and implementing a disaster recovery plan.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A system for responding to an outage of a computing system, the computing system being operatively connected to multiple user devices by a first network, the system comprising:

a sidecar computing system including a processor, a non-transitory storage device and multiple virtual machines, wherein computer-readable instructions are stored in the storage device;

a second network operatively connected to the sidecar computing system;

wherein the sidecar computing system is deactivated when the computing system is operating; and an event manager in communication with the computing system through the first network and in communication with the sidecar computing system through the second computer network, wherein the event manager activates the sidecar computing system to operate in an outage mode when the computing system has an outage.

2. The system according to claim 1 wherein the event manager activates the sidecar computing system in response to an outage event signal generated by at least one of the computing system, the first network and a designated employee through a computing device or a mobile device.

3. The system according to claim 2 wherein the activated sidecar computing system provides access to the virtual machines and a dedicated email system by authorized employees.

4. The system according to claim 1 wherein the event manager deactivates the sidecar computing system, when activated, in response to a resolution of the outage.

5. The system according to claim 1 wherein the event manager stores updated data from the computing system in the storage device in real time or at predetermined intervals.

6. The system according to claim 1 wherein the event manager periodically sends a test message to communication devices of authorized employees, the message including a request for a response.

7. The system according to claim 6 wherein when the event manager has not received a response to the test message from one of the employees after a predetermined response period, the event manager sends a reminder message to the one employee and/or generates a request to personally contact the one employee.

8. The system according to claim 6 wherein the test message includes an instruction to test connectively of the communication devices to the sidecar computing system.

9. The system according to claim 1 wherein the event manager includes a sidecar software application having computer-readable instructions for performing the activation of the sidecar computing system and includes a processor executing the computer-readable instructions, the processor being included in at least one of an event manager computing device, an event manager mobile device and the sidecar computing system.

10. The system according to claim 1 wherein the computing system and the sidecar computing system have different domain names associated therewith for communication through the Internet.

11. A method for responding to an outage of a computing system, the computing system being operatively connected to multiple user devices by a first network, the method comprising the steps of:

providing a sidecar computing system including a processor, a non-transitory storage device and multiple virtual machines, wherein computer-readable instructions are stored in the storage device;

operatively connecting the sidecar computing system to a second network;

wherein the sidecar computing system is deactivated when the computing system is operating; and providing an event manager in communication with the computing system through the first network and in communication with the sidecar computing system through the second computer network, and operating the event manager to activate the sidecar computing system to operate in an outage mode when the computing system has an outage.

12. The method according to claim 11 including operating the event manager to activate the sidecar computing system in response to an outage event signal generated by at least one of the computing system, the first network and a designated employee through a computing device or a mobile device.

13. The method according to claim 12 wherein the activated sidecar computing system provides access to the virtual machines and a dedicated email system by authorized employees.

14. The method according to claim 11 wherein the event manager deactivates the sidecar computing system, when activated, in response to a resolution of the outage.

15. The method according to claim 11 including operating the event manager to store updated data from the computing system in the storage device in real time or at predetermined intervals.

16. The method according to claim 11 including operating the event manager to periodically send a test message to communication devices of authorized employees, the message including a request for a response.

17. The method according to claim 16 including when the event manager has not received a response to the test message from one of the employees after a predetermined response period, operating the event manager to send a reminder message to the one employee and/or generate a request to personally contact the one employee.

18. The method according to claim 16 wherein the test message includes an instruction to test connectively of the communication devices to the sidecar computing system.

19. The method according to claim 11 wherein the event manager includes a sidecar software application having computer-readable instructions for performing the activation of the sidecar computing system and includes a processor executing the computer-readable instructions, the processor being included in at least one of an event manager computing device, an event manager mobile device and the sidecar computing system.

20. The method according to claim 11 including providing the computing system and the sidecar computing system with different domain names associated therewith for communication through the Internet.

* * * * *